Aug. 20, 1929.  E. G. THOMAS  1,725,493
COUNTING SCALE
Filed July 30, 1920  3 Sheets-Sheet 3

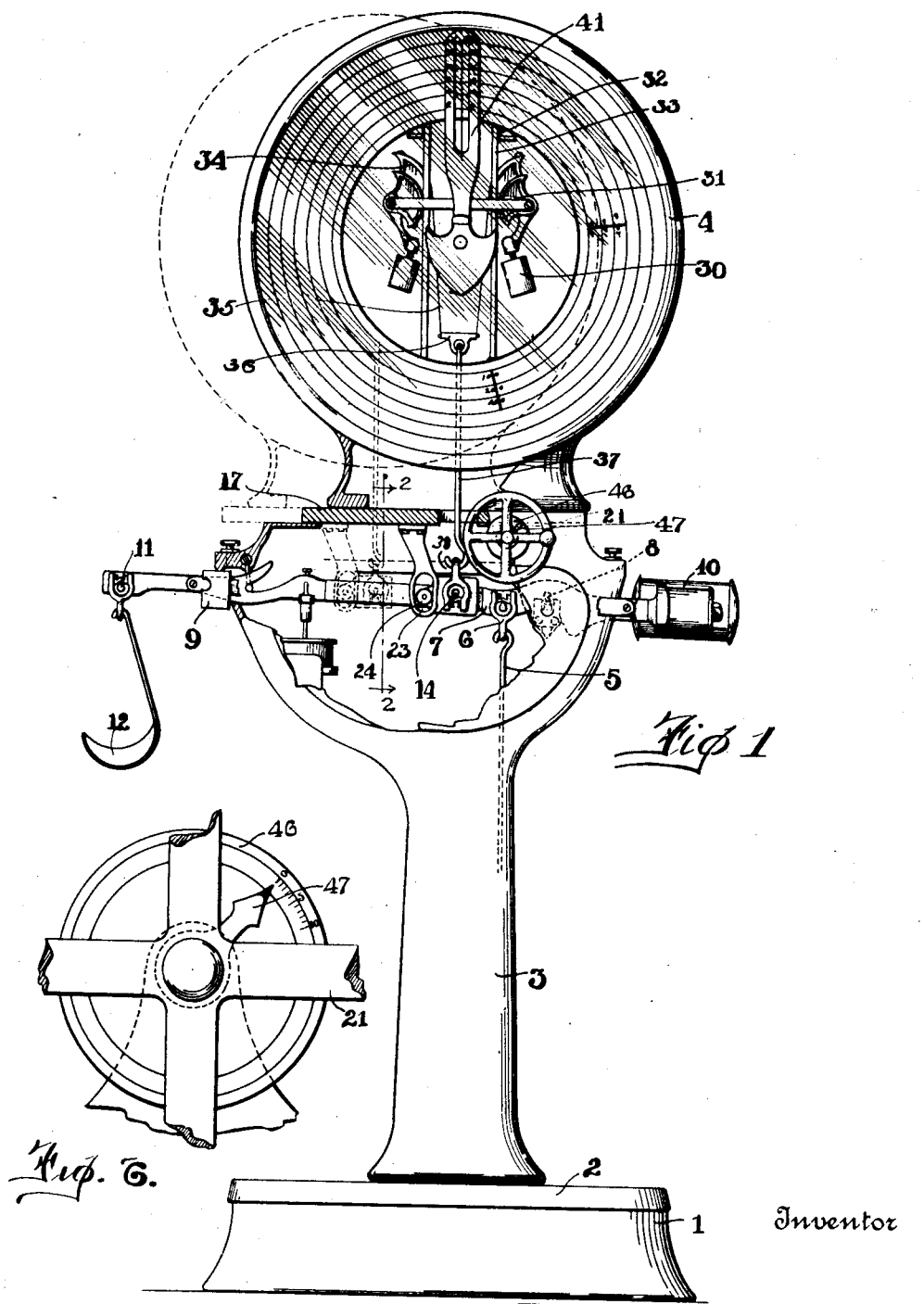

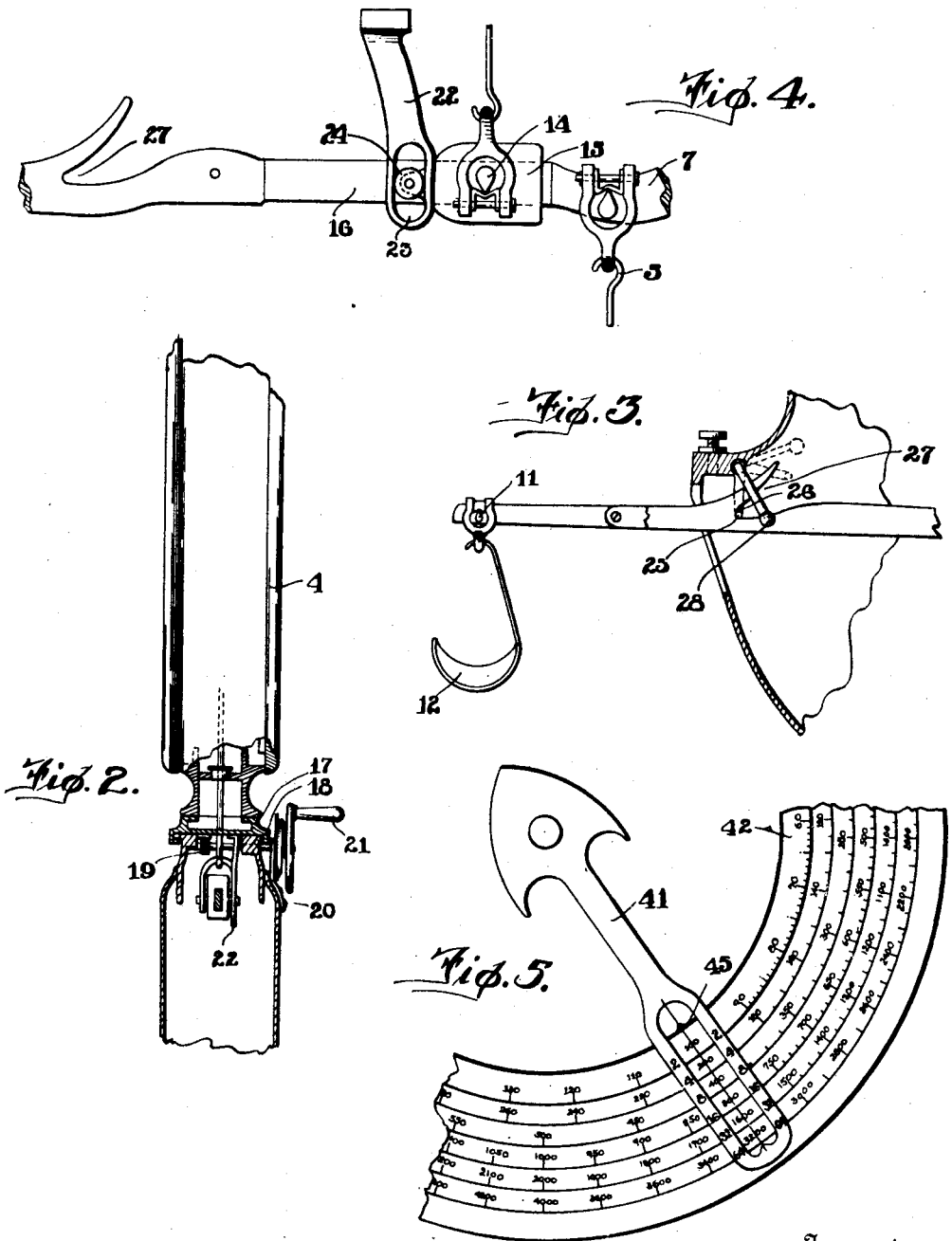

Inventor
Edward G. Thomas.
By George R. Frye
Attorney

Patented Aug. 20, 1929.

1,725,493

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

COUNTING SCALE.

Application filed July 30, 1920. Serial No. 400,015.

This invention relates to computing machines, and particularly to the class of devices known as counting scales.

One of its principal objects is the provision of a device of this character adapted to be set for counting articles of different average weights and capable, when set for articles of any particular weight, to automatically indicate the number of such articles in a lot placed upon the commodity-receiver.

Another object is the provision of a scale of this class adapted to be set by adjusting its multiplication according to the weight of a previously determined number of specimens of the articles to be counted.

Still another object is to provide a scale of this class having an auxiliary commodity-receiver or ratio pan so connected to the weighing mechanism as to have a higher leverage than the bulk commodity-receiver, whereby the scale may be set according to the weight of a comparatively few specimens.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is a front elevation of a scale embodying my invention, parts being broken away;

Figure 2 is a fragmentary side elevation thereof, parts being in section, substantially on the line 2—2 of Figure 1;

Figure 3 is an enlarged fragmentary elevation showing mechanism for positioning the multiplication adjustment lever in half capacity position;

Figure 4 is a still further enlarged fragmentary elevation showing a portion of the multiplication adjustment lever;

Figure 5 is an enlarged fragmentary elevation showing the chart and index in detail;

Figure 6 is an enlarged fragmentary detail of an auxiliary indicator; and

Figure 7:
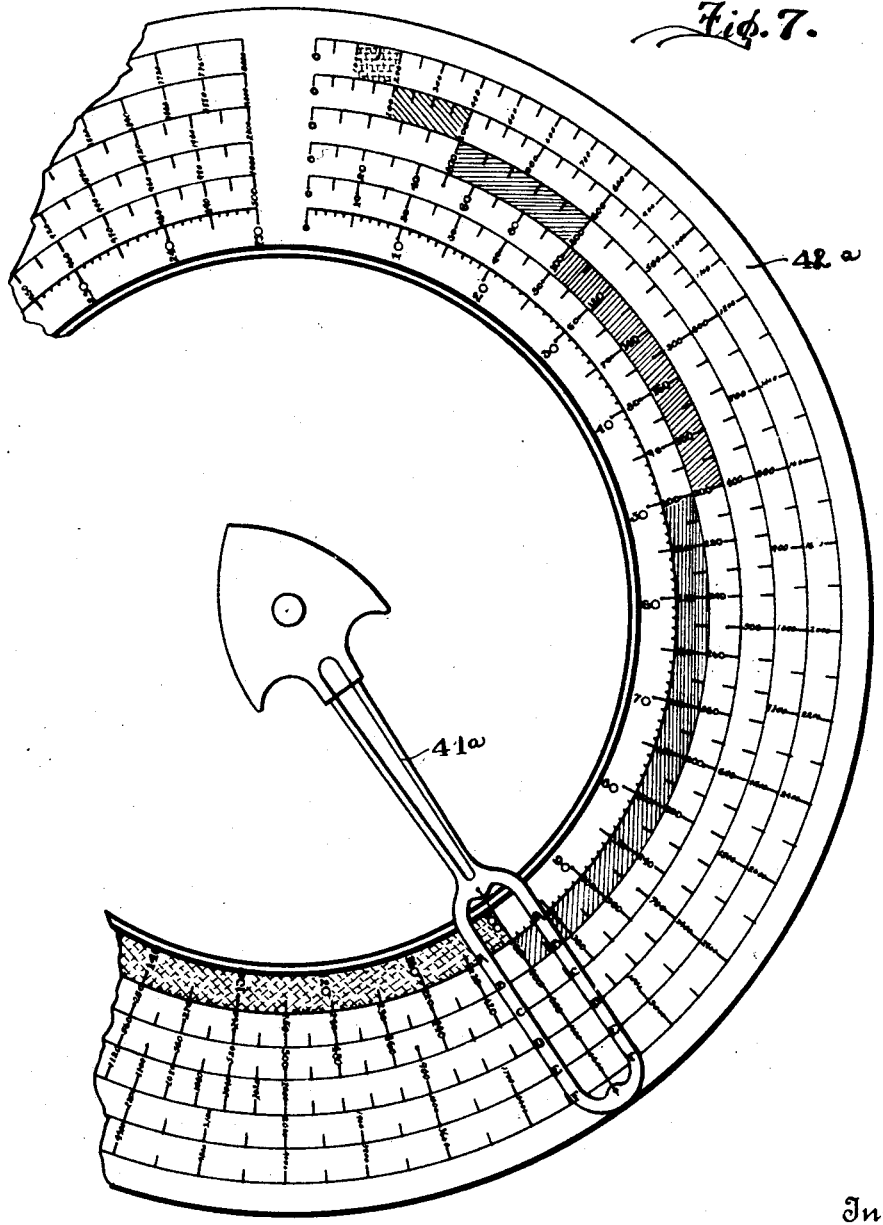
Figure 7 is an enlarged fragmentary elevation showing details of another form of chart.

I have shown my invention as embodied in weighing mechanism of the same general type as that shown and described in the application of Clarence H. Hapgood, Ser. No. 256,176, filed Sept. 30, 1918, but it is to be understood that while I prefer the form shown because of its accuracy and durability, the use of other forms of weighing mechanism is equally within the ambit of the invention.

In the form illustrated, the base 1 of the scale encloses platform lever mechanism (not shown) which supports the platform 2 in the usual way. A hollow standard or column 3 is supported upon the rear end of the base 1, and slidably mounted upon the upper end of the column 3 is a substantially watch-casing-shaped housing 4 which contains the automatic load-offsetting mechanism of the scale.

A steelyard rod 5 depends from a clevis 6 on a lever 7 which is fulcrumed, as at 8, within the column 3, and the lower end of the steelyard rod 5 is suitably connected to the platform lever mechanism so as to transmit movement of the platform levers to the lever 7. The lever 7 occupies substantially the position usually occupied by the tare beam lever in scales of the type shown and described in the above-mentioned application of Hapgood, and it may, if desired, be equipped with a tare beam and a poise 9 to offset the weight of containers, etc. One end of the lever 7 is provided with an adjustable loading box 10, while carried upon a knife-edge pivot 11 at its opposite end is a ratio pan 12, the platform levers and the lever 7 being so proportioned that the moment of force exerted by a given weight in the ratio pan 12 is 50 times as great as the moment of force exerted by an equal weight on the platform.

The pivot 14 for connection with the automatic load-offsetting mechanism is mounted upon a slide 15 which is movable along a portion 16 of the lever 7 to vary the force exerted by the lever upon the automatic mechanism. In order that the device may be accurate in all positions of adjustment, it is necessary that the connection from the lever 7 to the load-offsetting mechanism be in all adjustments substantially plumb. I have, therefore, so connected the housing containing the load-offsetting mechanism and the pivots carrying the slide 15 that they are movable laterally together. The lower wall of the housing 4 consists of a plate 17 having grooved guide flanges which co-operate with laterally-extending tongues 18 on the upper end of the column 3. Upon the lower side of the plate 17 is a rack which meshes with a pinion 19 fixed to a shaft 20 journaled in the front and rear walls of the column 3 and provided exteriorly of the column with a handle 21 by which it may be turned to move the housing from side to side.

Depending from the plate 17 is a rigid arm 22 having an arcuate slot 23 adjacent its lower end, which slot receives an anti-friction roller 24 carried by the slide 15. It is evident that as the housing 4 is moved laterally, the slide 15 is also moved by the arm 22 so that no out-of-plumb condition results in the connection between the lever and the automatic load-offsetting mechanism.

The slot 23 is widened at its ends so that the roller 24 is entirely out of contact with the arm 22 except when the lever is at horizontal or half capacity position. It is obvious, therefore, that if the slide 15 were positioned by the arm 22 with the lever at zero position, the connection to the load-offsetting mechanism would be out of plumb. To retain the lever in half capacity position I have provided a lock consisting of a lug 25 carried by a pivoted arm 26 and engagable with a notch 27 in the lever. The arm 26 may be moved to engage the lug 25 with the notch by means of a handle 28 which is located outside the column. The notch is suitably flared so that its sides form cam faces to move the lever into horizontal position when the lug is forced into the notch. The beam may thus be locked in half capacity position, when it is desired to move the slide 15, and released for weighing or counting.

The load-offsetting mechanism is not per se of my invention and I will therefore describe it only in such detail as is necessary to clearly show its connection with the other parts of the machine. It consists of a pair of oppositely-swinging pendulums 30 having fulcrum sectors 31 supported by flexible ribbons, the upper ends of which are attached, as at 32, to upright frame members 33. The pendulums are provided with power sectors 34 to which are connected the upper ends of flexible metallic ribbons 35, the lower ends of said ribbons being attached to a bar 36 at the upper end of a link 37, which in turn is connected by means of a clevis 38 to the slide-carried pivot 14. The pendulums are connected by a compensating bar which moves vertically upwardly when the pendulums swing outwardly, and a rack and pinion mechanism (not shown) drives the indicator 41 from the compensating bar, the parts being so constructed and arranged that the angular movement of the indicator is proportional to the weight of a load on the platform or ratio pan, as the case may be.

The indicator shown in Figures 1 and 5 swings over a circular dial 42 provided with a plurality of concentric annular series of graduations. The inner annular series consists of two hundred and fifty graduations; the next series five hundred; the third, one thousand; and so on, each circle being graduated to indicate twice as many units as the next smaller circle.

In the scale illustrated, the proportions of the parts are assumed to be such that when the housing is at its limit of travel to the right and the pivot 14 is closest to the pivot 8, a weight of 250 lbs. on the platform will swing the indicator 4 completely over the chart 42. The graduations on the inner circle will, therefore, indicate the weight of the load in pounds and the scale may in this adjustment be used for ordinary weighing operations. Since each device of the inner circle represents 1 lb. when the scale is in this position of adjustment, the number of 1 lb. units in a load on the platform is automatically indicated upon the inner circle, and if a load of articles weight 1 lb. each is placed upon the platform the number of such articles will be indicated upon the inner circle.

Since an object placed in the ratio pan produces 50 times the pull upon the head mechanism as the same object would if placed upon the platform, two objects placed in the ratio pan will turn the indicating mechanism through the same arc as would 100 like objects placed upon the platform. If the two objects in the ratio pan weigh 1 lb each, the indicator will register 100; if they weigh 1½ lb. each, it will register 150, with the head mechanism in the same position. If, however, the head mechanism and pivot 14 are moved to the left and the leverage thereby cut down, the indicator will move backwardly, and if this movement be continued until the indicator stands at 100, the scale is adjusted so that 100 like articles upon the platform will bring the indicator to 100, 50 like articles will bring the indicator to 50, and, in fact, the number of like units in any load placed on the platform will be automatically indicated on the inner circle. As will appear later, this position of the index hand 41 is used in setting the scale to count articles of all weights. I prefer, therefore, to distinctively mark this position on the chart 42 by means of an arrow head 45, or other symbol.

The upper limit of weight of articles which may be automatically counted is, of course, determined by the proportions of the parts and the extent of possible movement of the pivot 14 along the lever 7. In the scale illustrated, this limit is about 2 lbs., the pivot 14 being movable from its extreme right position to a position about double the distance from the fulcrum pivot 8. Articles weighing from 1 to 2 lbs. may thus be counted by use of the inner circle or series of graduations. It is obvious that two articles weighing less than 1 lb. each will not bring the indicator to the 100 graduation on the inner circle even when the pivot 14 is in its position nearest to the fulcrum pivot 7. It is for this reason that the chart is provided with additional series of graduations. The second circle is graduated to count articles weighing between ½ and 1 lb. Assuming the head mechanism to be at its extreme right position, two ½ lb. articles in the ratio pan will bring the indicator to the 50 graduation on the inner circle, and 100 ½ lb. articles upon the platform will bring the indicator to the same point. The 100 graduation of the second series is therefore placed in radial alignment with the 50 graduation on the inner series. The 200 graduation of this second circle is placed in alignment with the inner 100 graduation, and so on, the number of divisions of the second circle being twice the number of the first circle, the number of graduations on the third circle being twice the number on the second, the number on the fourth being twice that on the third, and so on.

In using a scale equipped with the chart shown in Figures 1 and 5, the head mechanism being in its right-hand position, two specimens of the articles to be counted are placed in the ratio pan. If the index swings beyond the arrow head 45, the head mechanism is shifted to the left by means of the crank 21 until the indicator registers with the arrow head and the 100 graduation on the inner circle. The specimens are then removed from the ratio pan, the load placed on the platform, and the total number of articles read upon the inner circle. If the weight of two specimens is insufficient to bring the hand to the arrow head, specimens are added two by two until the mark is reached or passed. The head mechanism is then moved until the hand registers with the arrow head. If four specimens have been placed in the pan the pull upon the head mechanism will now be equal to that which would be produced by 200 like articles upon the platform. The total count is, therefore, to be read on the second circle. If eight specimens have been employed, the pull will be equal to that of 400 like articles on the platform. The total count is, therefore, in this case to be read on the third circle, and so on. In order to indicate to the operator the circle upon which the count is to be read, the hand 41 is marked with numerals 2, 4, 8, 16, 32 and 64. If four specimens are used the operator reads the count upon the circle beneath the numeral 4. If sixteen are required to bring the hand to the arrow head, he reads the count upon the circle beneath the numeral 16.

The respective weights of articles, the counts of which may be read upon the several circles, are as follows:

Inner or first circle, 1 to 2 lbs.
Second circle, ½ to 1 lb.
Third circle, ¼ to ½ lb.
Fourth circle, ⅛ to ¼ lb.
Fifth circle, $\frac{1}{16}$ to ⅛ lb.
Sixth circle, $\frac{1}{32}$ to $\frac{1}{16}$ lb.

Since the count of articles of a given weight is always read on the same circle, the operator soon becomes sufficiently expert to determine at once how many specimens should be used and to set the scale without first moving it to its extreme right position.

The position of the head mechanism is, of course, governed by the unit weight of the articles to be counted. It is desirable, therefore, that means be provided for indicating the position of the head mechanism when set so that when similar articles are to be counted it may again be placed in the same position without a weighing operation. To this end I have positioned a graduated dial 46 about the pinion-carrying shaft 20, and have fixed a pointer 47 to the shaft so that as the shaft is turned to move the head mechanism the pointer moves over the dial. The pinion and rack may be so proportioned that one revolution of the pinion is sufficient to move the head mechanism from extreme right to extreme left position, and when the parts are so proportioned, each position of the pointer 47 will correspond to a position of the head mechanism, or the parts may, as in the illustrated embodiment, be so proportioned that more than one revolution of the pinion is required to move the head mechanism from side to side. In this case the approximate position of the head mechanism and the exact position of the pointer are noted. The scale parts may then be set in the same relation whenever similar parts are to be counted. If desired, the adjacent portion of the housing 4 and column 3 may be graduated in order that the position of the housing may be readily noted.

In the modified form of indicating device shown in Figure 7, the section of each series of graduations on the chart 42ª between the 100 and 200 marks is tinted or otherwise prominently marked. In using a scale having this form of indicating mechanism the same number of specimens, regardless of their weight, (with the mechanism illustrated, two) is employed in setting the scale. Two specimens weighing each between 1 and 2 lbs. if placed in the ratio pan will move the indicator 41ª to some position over the tinted section of the inner circle. Two specimens weighing each between $\frac{1}{32}$ and $\frac{1}{16}$ lb. will move it to some position over the tinted section of the outer circle, and two specimens of any weight between $\frac{1}{16}$ lb. and 1 lb. will move it to some position over a tinted section of one of the intermediate circles.

The specimens are placed in the ratio pan and the head mechanism is then shifted until the indicator registers with the graduation at the beginning of one of the tinted sections— i. e., with the 100 graduation of that particular circle. It is then in the position to which it would be brought by 100 like articles on the platform. 50 like articles would move the indicator half as far as 100, or to the 50 graduation; 200 like articles would move it to the 200 graduation; and so throughout the entire range of graduations of that particular circle. The pivot 14 has been, in fact, moved to the same position as that to which it would have been moved in bringing the indicator and arrow head into registration in using the chart shown in Figures 1 and 5. The specimens may, therefore, be removed and the lot of articles placed on the platform and the count read upon the proper circle the same as in using the chart first described.

In order to assist in fixing the proper circle in the mind of the operator and as an aid in finding it when the count is to be read, the indicator 41ª is marked with characters or letters, such as A, B, C, D, etc., corresponding respectively to the several circles.

While it will be apparent that the illustrated embodiments of my invention herein disclosed are well calculated to adequately fulfill the objects primarily stated, the scale might be set according to the weight of 50, 100, or another arbitrary number of specimens placed upon the platform and the ratio pan might, therefore, in some cases be dispensed with, the variable leverage connection might be placed elsewhere between the commodity-receiver and the load-offsetting mechanism, and the invention is susceptible to various other changes and modifications within the spirit and scope of the subjoined claims.

Having described my invention, I claim:

1. In a counting scale, in combination, load-offsetting mechanism, a commodity-receiver, a ratio pan, lever mechanism connecting said commodity-receiver and said ratio pan to said load-offsetting mechanism, the leverage of said ratio pan being a multiple of the leverage of said commodity-receiver, and manually operated means for changing the ratio of the lever arms between said commodity-receiver and said load-offsetting mechanism and between said ratio pan and said load-offsetting mechanism.

2. In a counting scale, in combination, lever mechanism, two commodity-receivers connected thereto, one of said commodity-receivers having a leverage which is a multiple of the leverage of the other, load-offsetting mechanism, and manually operated means for variably connecting said load-offsetting mechanism to said lever mechanism.

3. In a counting scale, in combination, automatic load-offsetting mechanism, a commodity-receiver, a ratio pan, lever mechanism connecting said commodity-receiver and ratio pan to said load-offsetting mechanism, indicating mechanism having indicia representing numbers of articles on said commodity-receiver, and means for adjusting the multiplication of said lever mechanism to cause said indicating mechanism to indicate a multiple of the number of articles in said ratio pan.

4. In a counting scale, in combination, load-offsetting mechanism, a commodity-receiver, a ratio pan, lever mechanism connecting said commodity-receiver and ratio pan to said load-offsetting mechanism, an indicating device connected to said load-offsetting mechanism, and means for adjusting the multiplication of said lever mechanism in accordance with the unit weights of articles placed upon the ratio pan and thereby setting the scale to automatically indicate the number of articles placed upon the platform.

5. In a counting scale, in combination, load-offsetting mechanism, a commodity-receiver, a ratio pan, lever mechanism connecting said commodity-receiver and ratio pan to said load-offsetting mechanism, the leverage of said ratio pan being a multiple of the leverage of said commodity-receiver, a chart, means for adjusting the multiplication of said lever mechanism so that when articles are placed in said ratio pan a number is indicated upon said chart, which number is to the number of articles in the ratio pan as the leverage of said pan is to the leverage of said commodity-receiver.

6. In a counting scale, in combination, load-offsetting mechanism, a commodity-receiver, a ratio pan, lever mechanism connecting said commodity-receiver and said ratio pan to said load-offsetting mechanism, a chart having a plurality of series of graduations, the graduations of each series representing numbers of units within definite limits of weight, an index co-operating with said chart, and means for adjusting the multiplication of said lever mechanism to compensate for variations of weight within such limits.

7. In a counting scale, in combination, load-offsetting mechanism, a commodity-receiver, a ratio pan, lever mechanism connecting said commodity-receiver and said ratio pan to said load-offsetting mechanism, a chart having a plurality of series of graduations, the graduations of the successive series varying in geometric ratio, the graduations of each series representing numbers of units within definite limits of weight, an index co-operating with said chart, and means for adjusting the multiplication of said lever mechanism to compensate for variations of weight within such limits.

8. In a counting scale, in combination, load-offsetting mechanism, a commodity-receiver, a ratio pan, lever mechanism connecting said commodity-receiver and said ratio pan to said load-offsetting mechanism, a chart having a plurality of series of graduations, the graduations of each series representing numbers of units within definite limits of weight, the corresponding portion of each series of graduations being tinted, an index co-operating with said chart, and means for adjusting the multiplication of said lever mechanism to compensate for variations of weight within such limits.

9. In a counting scale, in combination, load-offsetting mechanism, a commodity-receiver, a ratio pan, lever mechanism connecting said commodity-receiver and said ratio pan to said load-offsetting mechanism, a chart having a plurality of series of graduations, the graduations of the successive series varying in geometric ratio, the graduations of each series representing numbers of units within definite limits of weight, the corresponding portion of each series of graduations being tinted, an index co-operating with said chart, and means for adjusting the multiplication of said lever mechanism to compensate for variations of weight within such limits.

EDWARD G. THOMAS.